United States Patent [19]
Yamada et al.

[11] Patent Number: 5,822,364
[45] Date of Patent: Oct. 13, 1998

[54] RECEIVING APPARATUS FOR SPECTRUM SPREAD SYSTEM

[75] Inventors: Daisuke Yamada, Tokyo; Keiji Takakusaki, Kanagawa, both of Japan

[73] Assignee: Matsushita Electric Industrial Co., Ltd., Osaka, Japan

[21] Appl. No.: 824,833

[22] Filed: Mar. 26, 1997

[30] Foreign Application Priority Data

Mar. 29, 1996 [JP] Japan .................................. 8-076428

[51] Int. Cl.⁶ .................................................. H04J 13/00
[52] U.S. Cl. .................................................... 375/200
[58] Field of Search .................................. 375/200, 207, 375/208, 260, 343; 370/320, 335, 342, 441, 479

[56] References Cited

U.S. PATENT DOCUMENTS

| | | | |
|---|---|---|---|
| 5,105,437 | 4/1992 | Kingston et al. | 375/208 X |
| 5,150,384 | 9/1992 | Cahill | 375/375 |
| 5,283,780 | 2/1994 | Schuchman et al. | 370/312 |
| 5,361,276 | 11/1994 | Subbramanian | 375/200 |
| 5,425,058 | 6/1995 | Mui | 375/336 |
| 5,448,600 | 9/1995 | Lucas | 375/205 |
| 5,619,524 | 4/1997 | Ling et al. | 375/200 |
| 5,659,573 | 8/1997 | Brucker et al. | 375/200 |
| 5,691,974 | 11/1997 | Zehavi et al. | 370/203 |
| 5,692,006 | 11/1997 | Ross | 375/200 |
| 5,737,327 | 4/1998 | Ling et al. | 370/330 |
| 5,742,637 | 4/1998 | Kanterakis et al. | 375/200 |

OTHER PUBLICATIONS

Technical Report of IEICE, A–P94–74, RCS94–98 (1994–10), "Performance of Coherent RAKE Detection using Interpolation on DS/CDMA", Akihiro Higashi et al.

*Primary Examiner*—Young T. Tse
*Attorney, Agent, or Firm*—Pearne, Gordon, McCoy & Granger LLP

[57] ABSTRACT

A spectrum spread receiver is provided with a delayed waveform phase determination circuit which determines whether or not a detected delayed waveform is in the phase as the previously-detected delayed waveform, and outputs a delayed waveform switch signal if they are out of phase with each other. If the delayed waveform switch signal is in an ON state, on the basis of the signal despread by a second despreading circuit 7 and the delayed waveform switch signal, a demodulation circuit 9 demodulates the first half and second half of a received signal, as a boundary is a received signal at which a delayed waveform switch signal is turned on, by using the phase estimated from a first known signal and the phase estimated from a second known signal, thereby preventing the received signal from becoming degraded.

4 Claims, 10 Drawing Sheets

RECEIVING APPARATUS FOR SPECTRUM SPREAD SYSTEM

BACKGROUND OF THE INVENTION

1. Field of the Invention

The present invention relates to a mobile radio receiving apparatus which employs a pilot coherent detections scheme with interpolation spectrum spread system.

2. Field of the Invention

Azuma et al. have proposed a coherent detection scheme with interpolation using pilot symbol spectrum spread system (RCS94-98 "performance of Coherent Rake Detection using interpolation on DS/CDMA"). The coherent detection scheme with interpolation using pilot symbol employs a frame structure, as illustrated in FIG. 8, which comprises an information signal 111, and first and second known signals tr1 and tr2 cyclically inserted into the information signal 111. A transmission path which varies due to multipath Reyleigh fading is estimated from the periods of the known signals tr1 and tr2. If coefficients $Z_1$ and $Z_2$ are estimated from tr1 and tr2, coefficient Z(k) which is an estimate of a transmission path at the kth symbol of N symbol of the information signal 111 can be obtained by primary interpolation of Z1 and Z2 in the following Equation (1).

$$Z(k)=Z_1(N-k)/N+Z_2k/N \tag{1}$$

Further, demodulated data $S_k$ at the kth symbol obtained after completion of pilot coherent detection scheme with interpolation is expressed as follows:

$$S_k = \sum_{i=1}^{p} Z^*_{i,k} \cdot r_{i,k} \tag{2}$$

where "p" designates the number of delayed waveforms to be subjected to RAKE; $Z^*_{i,k}$ designates a complex conjugate of the interpolatively estimated phase of the ith delayed waveform; and $r_{i,k}$ designates a received signal of the ith delayed waveform.

FIG. 9 illustrates the configuration of a conventional detection circuit employing a pilot coherent detection scheme with interpolation RAKE method in which there are three delay taps. When a despread received signal 112 enters a delay tap 113 having taps arranged at chip intervals, a switch 120 is turned on during the periods of first and second known signals 114 and 115 which are similar to the previously described known signals. During the respective periods of the first and second known signals 114 and 115, a phase estimation circuit 123 estimates a transmission path which varies due to multipath Reyleigh fading according to an adaptive algorithm (e.g., an RLS algorithm or the like) for each delayed waveform. Adder 126 add up outputs of multipliers 116 and the known signal 114 or 115 which is switched by a switch 125, thereby producing error signals 121. Weighting coefficients 122 of the multipliers 116 are controlled so as to minimize the square of the sum of error signals 121. During the period of the information signal, the switch 120 is turned off, and the weighting coefficients 122 estimated from the first and second known signals 114 and 115 are subjected to the primary interpolation performed by phase update sections 124 using Equation (1). As a result, the weighting coefficients 122 are updated, and optimum weights are assigned by the multipliers 116. Next, an adder 117 adds up the results of the multipliers 116, and it is determined whether an output of the adder 117 is positive or negative, thereby reproducing data 119 with fewer errors.

FIG. 10 is a block diagram illustrating the schematic configuration of a pilot coherent detection scheme with interpolation spectrum spread receiver. A signal received by a receiver antenna 201 is amplified by a receiving circuit 202. The thus-amplified signal is subjected to A/D conversion by an A/D converter 203 (at a sampling interval=n/T and a chip rate=1/T, where "n" is an integer). The thus digitally-converted signal is subjected to detection of correlation by a first despreading circuit 204. The received signal is further averaged by a delay profile measurement instrument 205. A searcher circuit 206 selects several higher-level sampled delayed waveforms having high receiving levels and outputs the thus-selected delayed waveforms to a second despreading circuit 207. The second despreading circuit 207 despreads the digital data signal converted by the A/D converter circuit 203 thereby to produce received data. The received data is demodulated by a demodulation circuit 209 through pilot coherent detection scheme with interpolation for each of the delayed waveforms selected by the searcher circuit 206, and the thus-demodulated delayed waveforms are subjected to RAKE synthesis. Desired information is obtained by dividing the thus-composed signal into a control signal and a sound signal or data. A timing control circuit 208 controls all timing and sequences of the spectrum spread receiver.

However, in the previously described conventional spectrum spread receiver, the state of delayed waveforms changes moment by moment in mobile communications environment, and delayed waveforms to be demodulated change. However, in mobile communications environment, the state of delayed waveforms changes moment by moment and delayed waveforms to be demodulated change. Therefore, the conventional spectrum spread receiver as described above has a problem to reduce the receiving quality, because when the delayed waveforms to be subjected to interpolation is switched, the phase estimated from the first half known signal may be inverted with respect to the phase estimated from the second half known signal, and if the thus-estimated phases are interpolated, it will become impossible to correctly estimate the phase of the received signal.

SUMMARY OF THE INVENTION

It is an object of the present invention is to provide a superior spectrum spread receiver capable of preventing degradation of a received signal even if the delayed waveform is changed.

To accomplish the aforementioned object, a receiving apparatus for the spectrum spread system of the present invention determines whether or not a delayed waveform is in phase with the previously detected delayed waveform. If the delayed waveform is switched, a first half signal is demodulated by use of a phase estimated from the first known signal and a second half signal is demodulated by use of a phase estimated from the second known signal as a boundary is a received signal at which a delayed waveform switch signal is turned on, without interpolating a phase estimated from known signals contained in both ends of an information signal.

As a result, the received signal is prevented from becoming degraded even if the phase of the delayed waveform is switched.

DETAILED DESCRIPTION OF THE INVENTION

Figure 1:
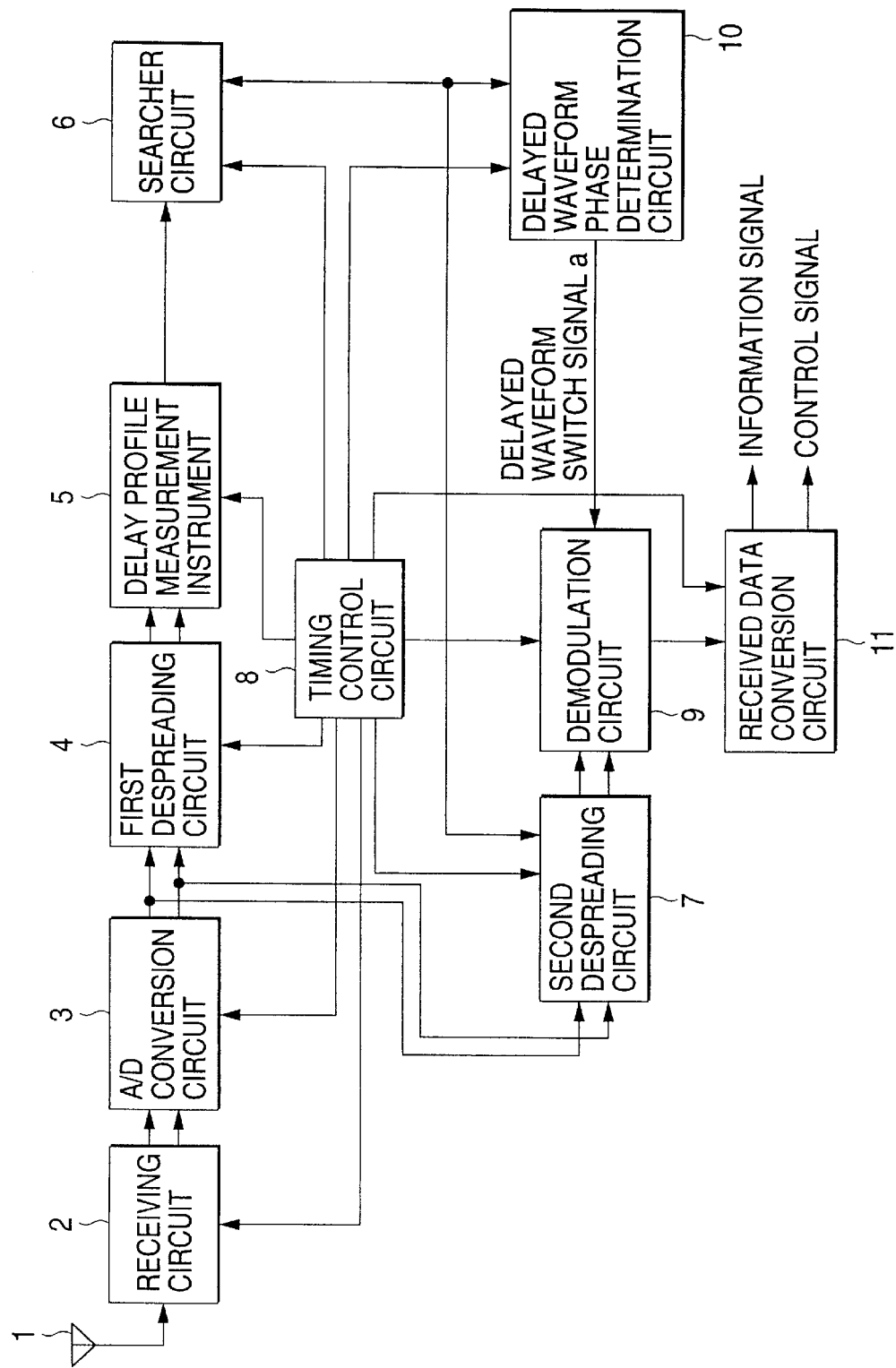
FIG. 1 is a block diagram illustrating the configuration of a spectrum spread receiver according to a first embodiment of the present invention.

Detailed description of the present invention will be described as follows.

A receiving apparatus for a spectrum spread system according to the present invention includes first and second despreading circuit, a delay profile measurement instrument, a searcher circuit, a delayed waveform phase determination circuit and a demodulation circuit.

The first and second despreading circuits, such as a matched filter, receives the predetermined number of bits of a digital signal oversampled by an A/D converter circuit, and despread the thus-received signal. The delay profile measurement instrument averages the profile of each chip phase of the signal despread by the first despreading circuit. The searcher circuit detects a delayed waveform of the predetermined number of higher-level samples having high receiving levels from the signal output from the delay profile measurement instrument, constantly continues detecting the predetermined number of higher-level samples, and reproduces a symbol clock signal based on the position of the peak of the delayed waveform. The delayed waveform phase determination circuit determines whether or not the delayed waveform detected by the searcher circuit is in the same phase as the previously detected delayed waveform, and outputs a delayed waveform switch signal if the delayed waveforms are out of phase with each other. If the delayed wave switch signal is in an ON state, the demodulation circuit demodulates the first half and the second half of the received signal as a boundary is a received signal at which a delayed waveform switch signal is in an ON state based on the signal which is despread in the second circuit and the delayed wave switch signal of the delayed waveform phase determination circuit, without interpolating the phases estimated from the first and second known signals included in both ends of the information signal. As a result of this arrangement, even if the delayed waveform is switched to another delayed waveform, the received signal is prevented from becoming degraded.

Further, the demodulation circuit of the receiving apparatus according to the present invention may be constructed as follows. If the delayed waveform switch signal is in an ON state, the demodulation circuit sequentially updates the phase estimated from the first known signal by using an adaptive algorithm or the like and demodulate the first half received signal by using the first updated phase, and sequentially updates the phase estimated from the second known signal by using an adaptive algorithm or the like and demodulate the second half received signal by using the second updated phase as a boundary is the received signal at which a delayed waveform switch signal is turned on. As a result of this arrangement, even if the delayed waveform is switched to another delayed waveform, the received signal is prevented from becoming degraded.

Furthermore, the receiving apparatus according to the present invention may further have a fading estimation circuit. If the delayed waveform switch signal is in the ON state, the fading estimation circuit detects variations in the level of the signal output from the delay profile measurement instrument and a fading pitch from the amount of change in the output signal level. Then, if the fading pitch detected by the fading estimation circuit is slower than the cycle of interpolation of the known signals and the delayed waveform switch signal is in the ON state, the demodulation circuit respectively demodulates the first half and second half of the received signal, as a boundary is a received signal at which a delayed waveform switch signal is turned on, by using the phase estimated from the first known signal and the phase estimated from the second known signal without interpolating the phases estimated from the first and second known signals included in both ends of the information signal. On the other hand, if the fading pitch detected by the fading estimation circuit is faster than the interpolation period of the known signal and the delayed waveform switch signal is in the ON state, the demodulation circuit sequentially updates the phase estimated from the first known signal by using an adaptive algorithm or the like and demodulate the first half received signal by using the first updated phase, and sequentially updates the phase estimated from the second known signal by using an adaptive algorithm or the like and demodulate the second half received signal by using the second updated phase as a boundary is the received signal at which a delayed waveform switch signal is turned on. As a result of these arrangements, even if the delayed waveform is switched to another delayed waveform, the received signal is prevented from becoming degraded.

Alternatively, the demodulation circuit of the receiving apparatus having the fading circuit may be constructed as follows. On the basis of the phase estimated from the first and second known signals included in both ends of an information signal, the demodulation circuit demodulates a predetermined number of samples after the first known signal or a predetermined number of samples before the second known signal of the received signal, and then, estimates the phase of new first or second known signal containing the first or second known signal and the demodulated signal. If the fading pitch detected by the fading estimation circuit is slower than the cycle of interpolation of the known signals, the demodulation circuit demodulates the first half of the received signal by using the phase which is estimated from the new first known signal, and demodulates the second half of the received signal by using the phase which is estimated from the new second known signal. In contrast, if the fading pitch detected by the fading estimation circuit is faster than the interpolation periods of the known signals, the demodulation circuit sequentially updates the phase estimated from the new first known signal by using an adaptive algorithm and demodulates the first half signal by using thus updated phase, and sequentially updates the phase estimated from the new second known signal by using an adoptive algorithm and demodulates the second half signal by using thus updated phase. As a result of these arrangements, even if the delayed waveform is switched to another delayed waveform, the received signal is prevented from becoming degraded.

With reference to the accompanying drawings, embodiments of the present invention will be described hereinbelow.

First Embodiment

FIG. 1 illustrates the configuration of a spectrum spread receiver according to a first embodiment of the present invention. In FIG. 1, reference numeral 1 designates an antenna; 2, a receiving circuit; 3, an A/D converter circuit; 4, a first despreading circuit; 5, a delay profile measurement instrument; 6, a searcher circuit; 7, a second despreading circuit; 8, a timing control circuit; 9, a demodulation circuit; 10, a delayed waveform phase determination circuit; and 11, a received data conversion circuit.

In FIG. 1, a signal received by the antenna 1 is amplified by the receiving circuit 2, and the thus-amplified signal is subjected to analog-to-digital conversion by the A/D conversion circuit 3. The thus-converted digital signal is subjected to detection of correlation by the first despreading circuit 4, and the delay profile measurement instrument 5 averages the received signal. The searcher circuit 6 selects a delayed waveform of several higher-level samples having a high receiving level and outputs the thus-selected waveform to the second despreading circuit 7 and the delayed waveform phase determination circuit 10. The second despreading circuit 7 despreads the digital data signal converted by the A/D converter circuit 3 to thereby obtain received data. The delayed waveform determination circuit 10 determines whether or not the delayed waveform detected by the searcher circuit 6 is in the same phase as the previously detected delayed waveform and outputs a delayed waveform switch signal a. If the waveforms are out of phase with each other, the delayed waveform switch signal a is turned on. If the delayed waveform switch signal a is in an ON state, on the basis of the received data despread by the second despreading circuit 7 and of the delayed waveform switch signal a of the delayed waveform phase determination circuit 10, the demodulation circuit 9 respectively demodulates the first half and second half of the received signal as a boundary is a received signal at which a delayed waveform switch signal a is turned on by use of the phase estimated from a first known signal and the phase estimated from a second known signal, without interpolating the phase estimated from the first and second known signals included in both ends of the information signal. The thus-demodulated delayed waveforms are subjected to RAKE synthesis. In contrast, provided that the delayed waveform switch signal a is in an OFF state, the demodulation circuit 9 demodulates the received signal by interpolating the phase estimated from the first and second known signals included in both ends of the received signal, and the thus-demodulated delayed waveforms are subjected to RAKE synthesis. The received data conversion circuit 11 obtains desired information by dividing thus-composed data into a control signal and a sound signal or data. The timing control circuit 8 controls all timing and sequences of the spectrum spread receiver.

Figure 2:
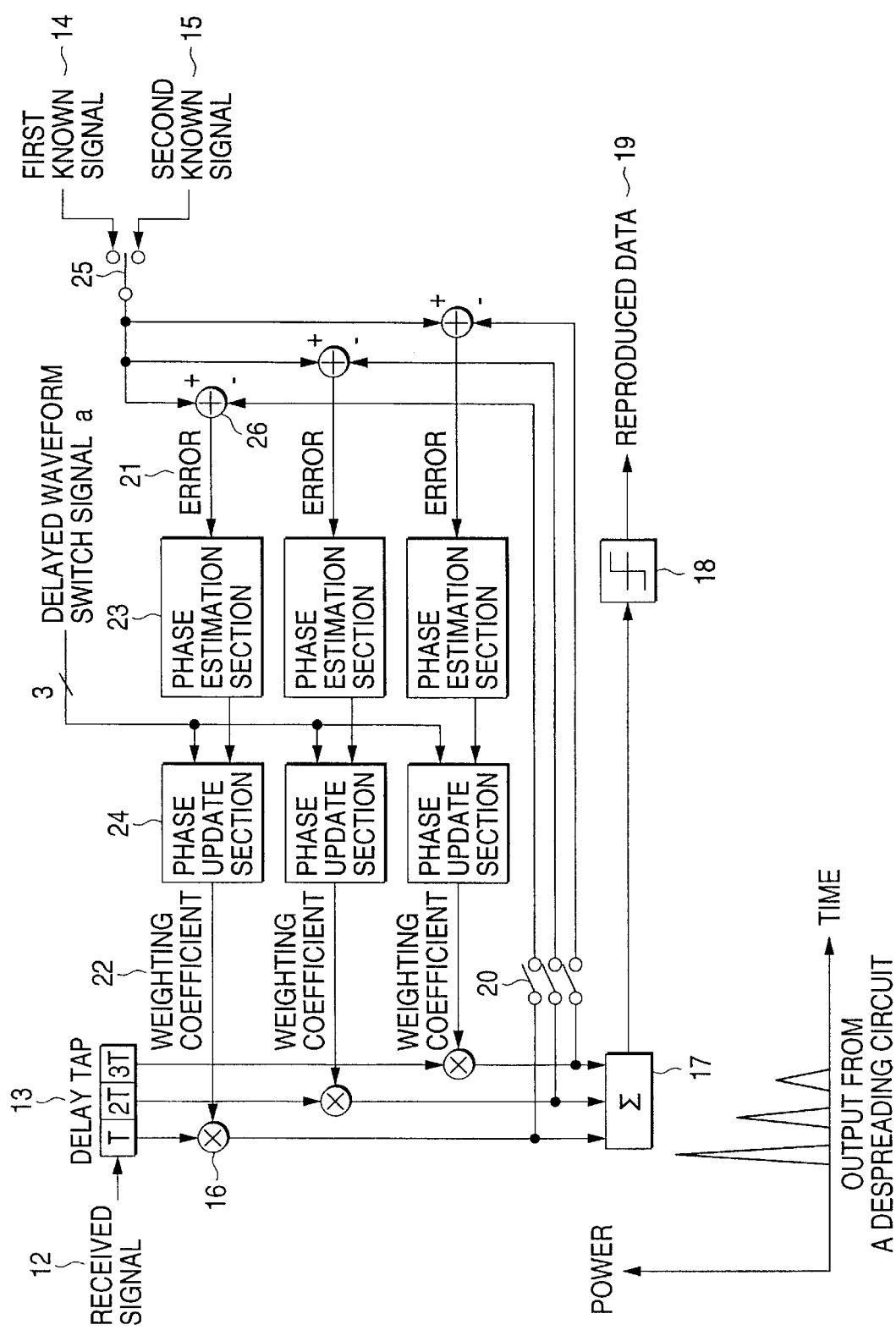
FIG. 2 is a block diagram illustrating the configuration of a demodulation circuit (having a delay tap 3) used in the first embodiment of the present invention.
Figure 9:
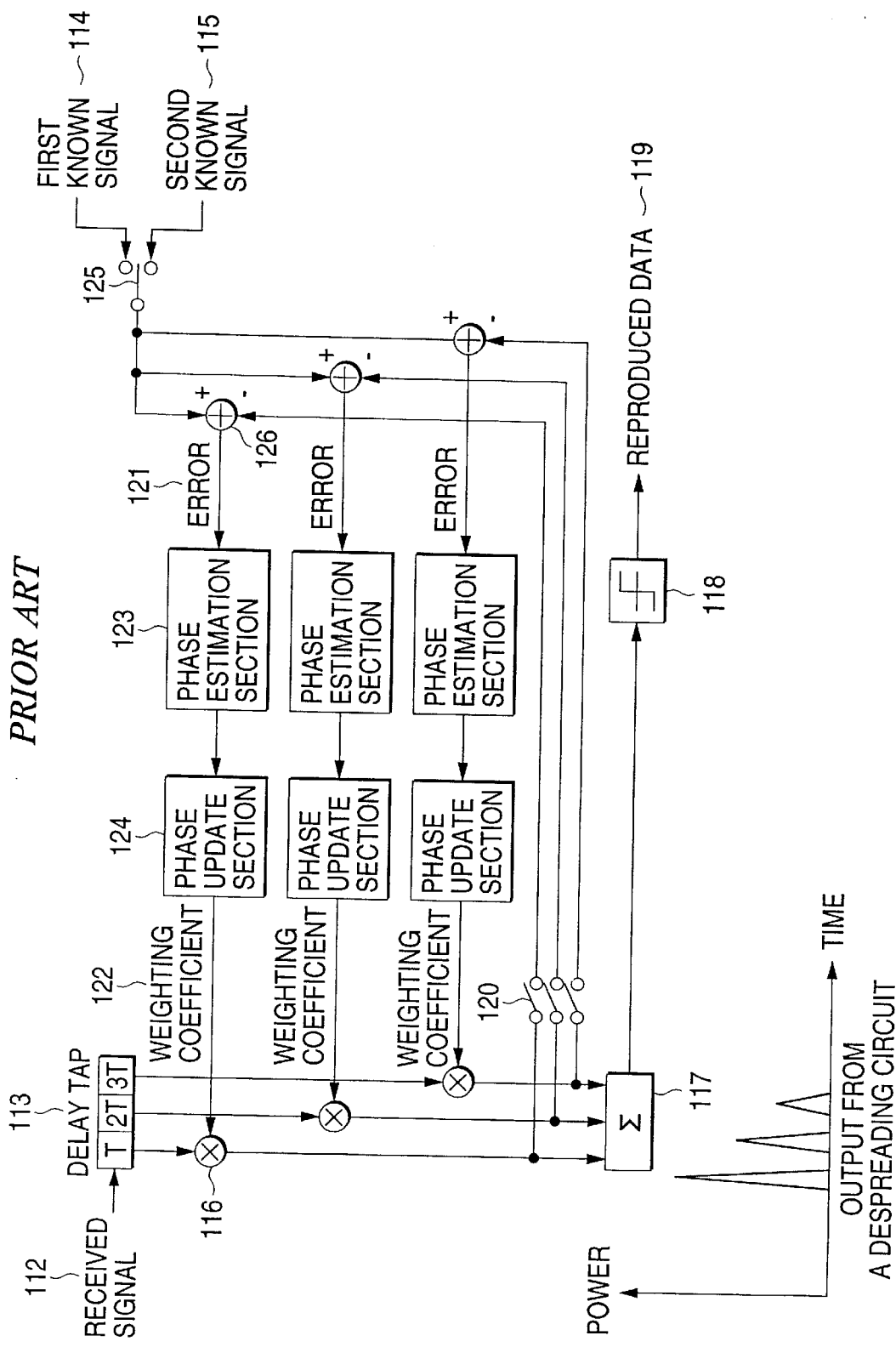
FIG. 9 is a block diagram illustrating the configuration of a conventional demodulation circuit (having a delay tap 3)
Figure 10:
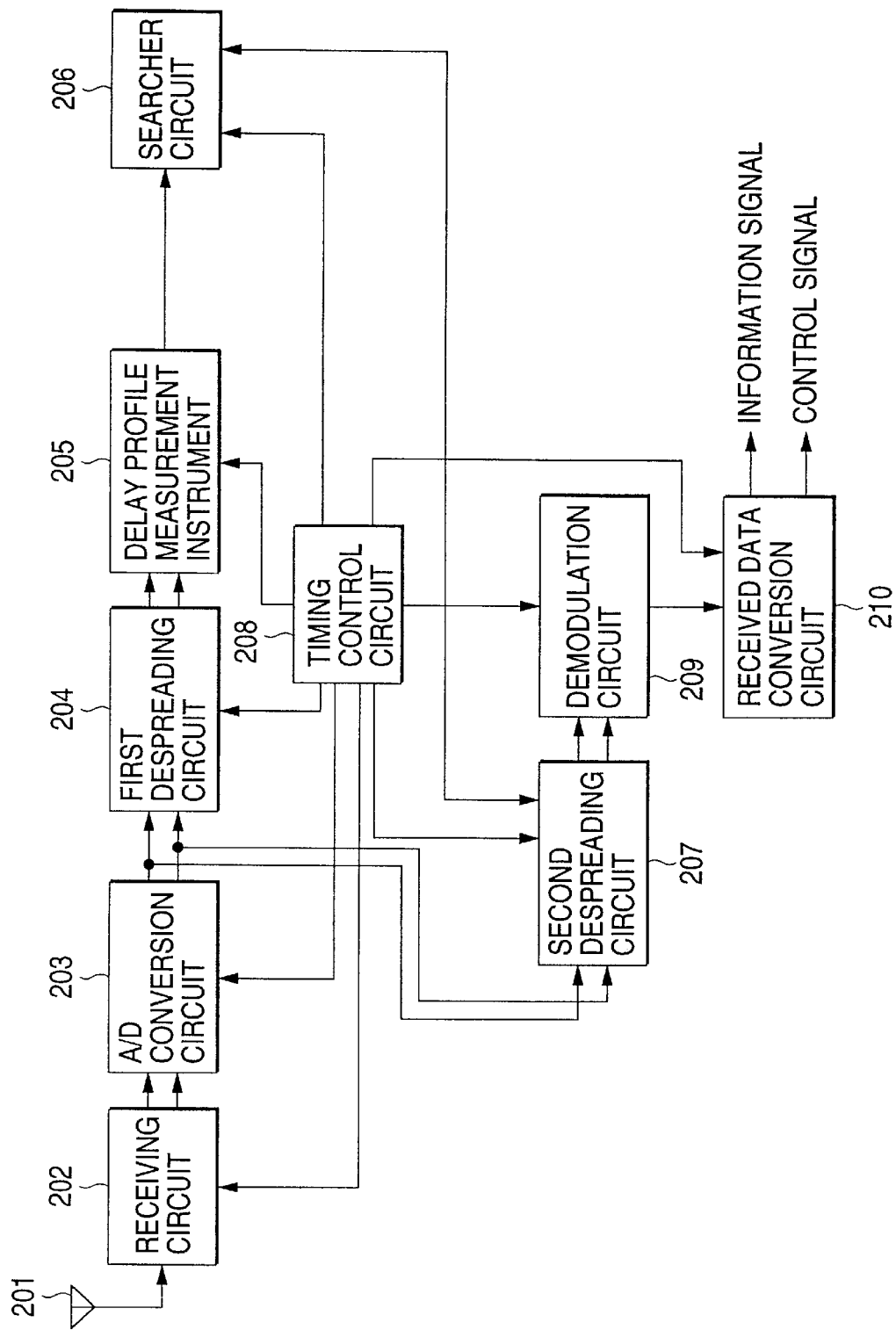
FIG. 10 is a block diagram illustrating the configuration of a conventional spectrum spread receiver.

FIG. 2 illustrates the configuration of the demodulation circuit 9 of the first embodiment. The elements numbered from 12 to 20 provided in FIG. 2 are identical with those numbered from 112 to 120 of the conventional detection circuit provided in FIG. 9. During the periods of the known signals, they operate in the same way as do the elements of the conventional circuit provided in FIG. 9. A switch 20 is in the OFF state during the period of an information signal. In the case of the delayed waveform that turned on the delayed waveform switch signal a, the phase of the received signal is not updated by phase update sections 24. Multipliers 16 assign optimum weights 22 estimated during the period of a first known signal 14 to the first half of the received signal in relation to the point in time at which the delayed waveform switch signal a is turned on. Further, the multipliers 16 assign the optimum weights 22 estimated during the period of a second known signal 15 to the second half of the received signal. A switch 25 effects the switching between known signals 14 and 15. An adder 17 adds up delayed waveforms of the received signal. An identifier 18 then determines whether an output of the adder 17 is positive or negative, thereby reproducing the data 19 with fewer errors. Error signals 21 are calculated by the adders 26 through addition of the first known signal 14 or second known signal 15 to the outputs of the multipliers 16. The delayed waveform which the delayed waveform switch signal a is turned off is subjected to primary interpolation of the weighting coefficients 22 estimated from the error signals 21 at a phase update section 24 by using the Equation (1), is updated the weighting coefficients 22, and then is assigned the optimum weight. The adder 17 adds up thus-weighted delayed waveforms. The identifier 18 determines whether an output of the adder 17 is positive or negative, thereby reproducing the data 19 with fewer errors.

Figure 3:
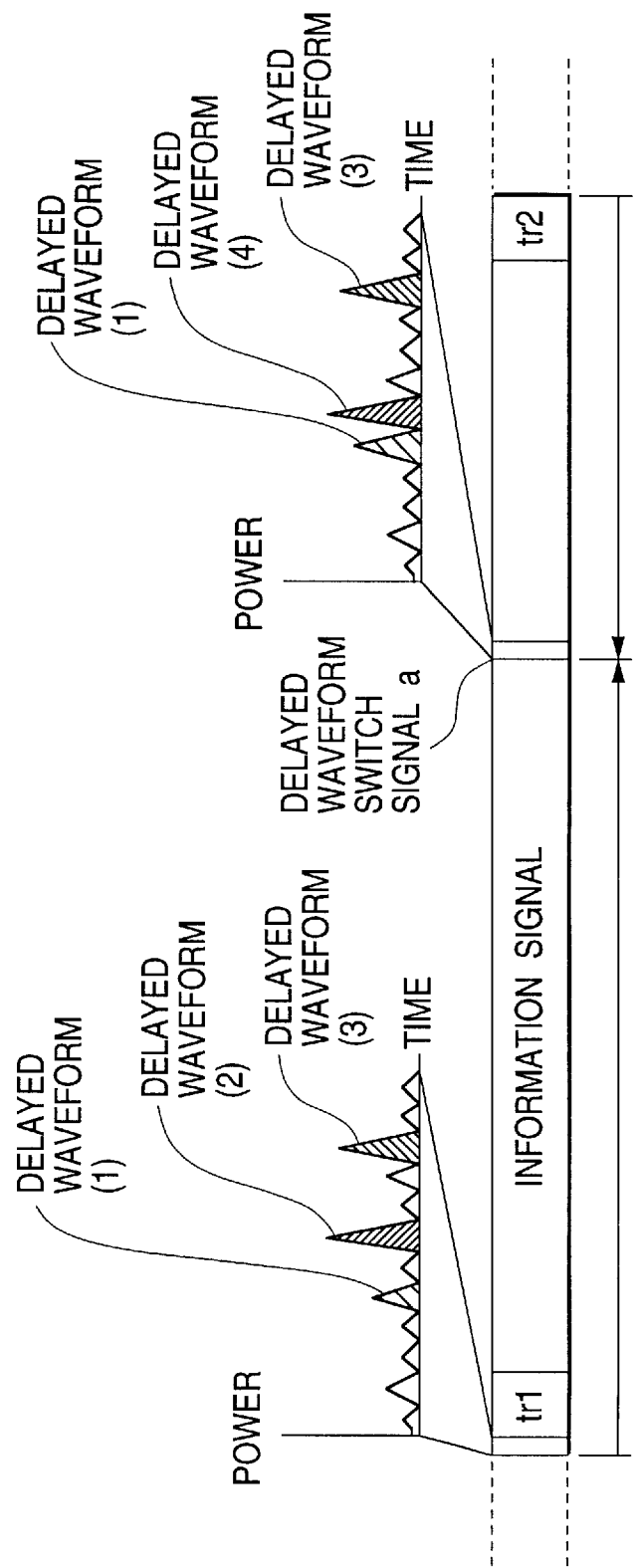
FIG. 3 is a schematic representation illustrating an example of operation of the demodulation circuit of the first embodiment.

FIG. 3 illustrates an example of operation of the demodulation circuit 9. An explanation will be given of a case where the delayed waveforms to be demodulated in the head end of the known signal tr1; i.e., delayed waveform (1), delayed waveform (2) and delayed waveform (3) are switched to the delayed waveform (1), the delayed waveform (3) and delayed waveform (4) at a certain point in time during the information signal. The delayed waveforms (1) and (3) can be demodulated by interpolating the known signals tr1 and tr2. However, if the delayed waveform (2) to be demodulated is switched to the delayed waveform (4), it is necessary to demodulate the delayed waveform (2) in order to obtain the first half of the received signal in relation to the delayed waveform switch signal a. Further it is necessary to demodulate the delayed waveform (4) in order to obtain the second half signal. In such a case, the delayed waveforms (2) and (4) are subjected to fading independently of each other, and therefore the received signal is degraded by interpolation of the known signals tr1 and tr2. In order to prevent this problem, as a boundary is the delayed waveform switch signal a, the first half of the received signal is obtained by demodulating the delayed waveform (2) by use of the known signal tr1, and the second half of the received signal is obtained by demodulating the delayed waveform (4) by use of the known signal tr2.

It is assumed that $Z^*_{i,1}$ and $Z^*_{i,2}$ designate complex conjugates of the estimated phase of the ith delayed waveform, "p" designates the number of delayed waveforms to be subjected to RAKE; and $r_{i,k}$ designates a received signal of the ith delayed waveform, the kth demodulated data $S_k$ after having been subjected to pilot coherent detection scheme with interpolation is expressed as follows:

Data on the first half of the received signal before the delayed waveform switch signal "a" is expressed by:

$$S_k = \sum_{i=1}^{P} Z^*_{i,1} \cdot r_{i,k} \quad (3)$$

Data on the second half of the received signal after the delayed waveform switch signal "a" is expressed by:

$$S_k = \sum_{i=1}^{P} Z^*_{i,2} \cdot r_{i,k} \quad (4)$$

As has been described above, according to the first embodiment of the present invention, the spectrum spread receiver is provided with the delayed waveform phase determination circuit 10. Accordingly, even if the phase of the delayed waveform to be demodulated is switched, the received signal can be prevented from becoming degraded.

Second Embodiment

Figure 4:
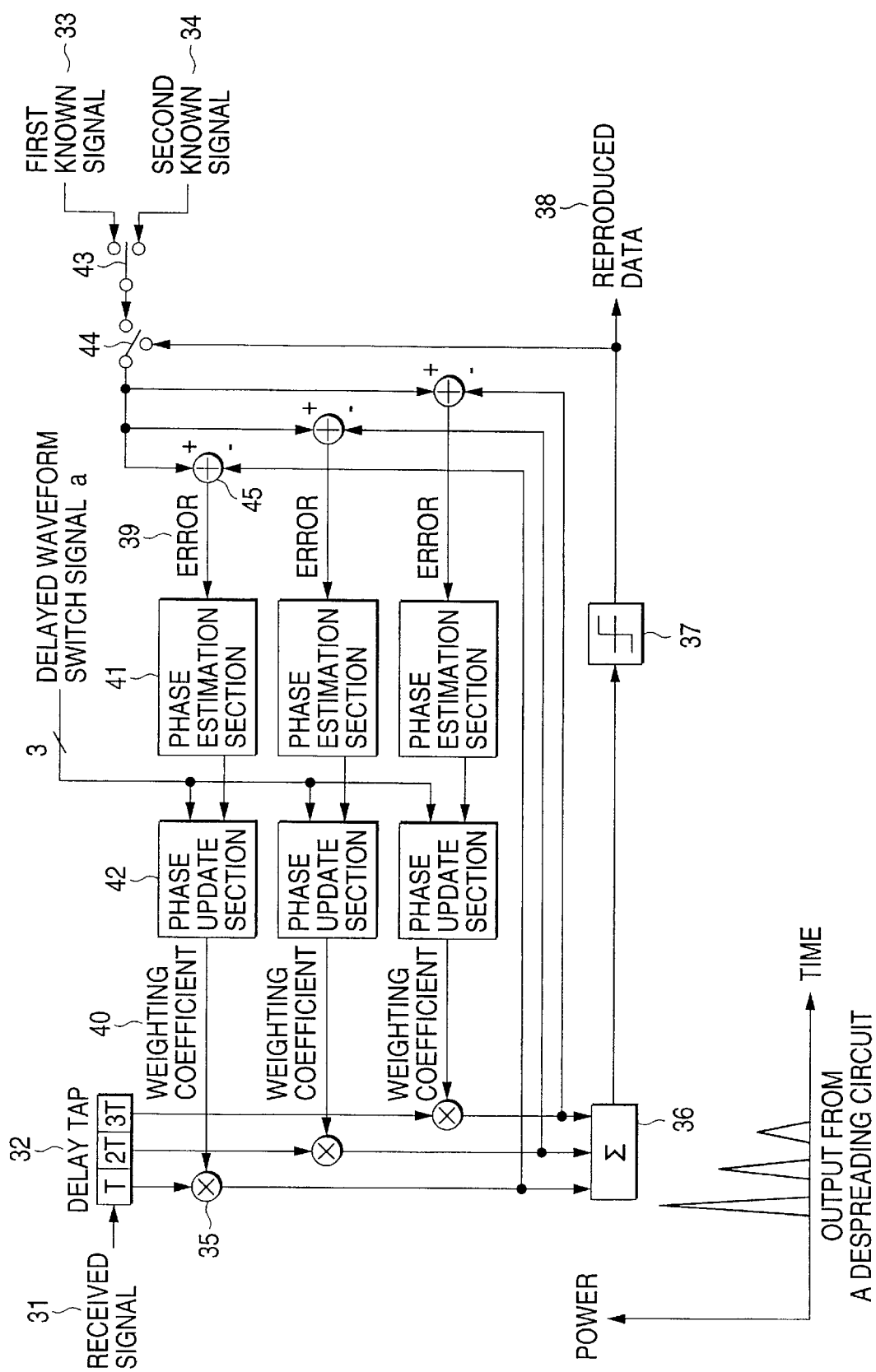
FIG. 4 is a block diagram illustrating the configuration of a demodulation circuit (having a delay tap 3) used in a second embodiment of the present invention.

Next, a second embodiment of the present invention will be described. The spectrum spread receiver of the second embodiment is the same in configuration as that provided in FIG. 1, except the configuration and operation of the demodulation circuit 9. FIG. 4 illustrates the configuration of the demodulation circuit of the second embodiment. The elements numbered from 31 to 38 provided in FIG. 4 are the same as those numbered from 112 to 119 of the conventional circuitry illustrated in FIG. 9. During the periods of the known signals, they operate in the same way as do the elements of the conventional circuit provided in FIG. 9. Even in the period of the information signal, weighting coefficients 40 are updated. In the case of the delayed waveform in which the delayed waveform switch signal a is in the ON state, the first half of the received signal before the delayed waveform which the delayed waveform switch signal a becomes in the ON state updates the weighting coefficient 40 of the multiplier 35 so that the weighting coefficient 40 estimated in the period of the first known signal 33 minimizes the square of the sum of error signals 39 (differences between the outputs of the multipliers 35 and the result of the addition of the output of the identifier 37 carried out by the adder 45) for each delayed waveform by using an adaptive algorithm (an RLS algorithm or the like) in the phase update section 42 even in the period of the information signal. These switching operations are performed by switches 43 and 44. The multipliers 35 assign the thus-updated optimum weights 40 to the delayed waveforms. An adder 36 adds up the thus-weighted delayed waveforms. The identifier 37 then determines whether an output of the adder 36 is positive or negative, thereby reproducing data 38 with fewer errors. With regard to the second half of the received signal, operations are performed on the basis of the weighting coefficients 40 estimated from the second known signal 34 in the same way as for the first half of the received signal.

In the case of the delayed waveform in which the delayed waveform switch signal a is in the OFF state, the period of the signal between the first and second know signals 33 and 34 is equally divided. The first half of the received signal updates the weighting coefficient 40 estimated in the period of the first known signal 33 of the multiplier 35 so that the weighting coefficient 40 estimated in the period of the first known signal 33 minimizes the square of the sum of error signals 39 (differences between the outputs of the multipliers 35 and the output of the identifier 37) for each delayed waveform by using an adaptive algorithm (an RLS algorithm or the like) in the phase update section 42. The multipliers 35 assign thus-updated optimum weights 40 to the delayed waveforms. The adder 36 adds up the thus-weighted waveforms. The identifier 37 then determines the output of the adder 36 to be positive or negative, thereby reproducing the data 38 with fewer errors. With regard to the second half of the received signal, operations are performed on the basis of the weighting coefficients 40 estimated from the second known signal 34 in the same way as in the case of demodulation of the first half of the received signal.

As described above, according to the second embodiment of the present invention, the spectrum spread receiver is provided with the delayed waveform phase determination circuit 10 so that the demodulation circuit 9 can sequentially update the phases of the delayed waveforms. As a result, the quality of a received signal can be improved, and the received signal can be prevented from becoming degraded even if the phase of the delayed waveform to be demodulated is switched to another phase.

Third Embodiment

Figure 5:
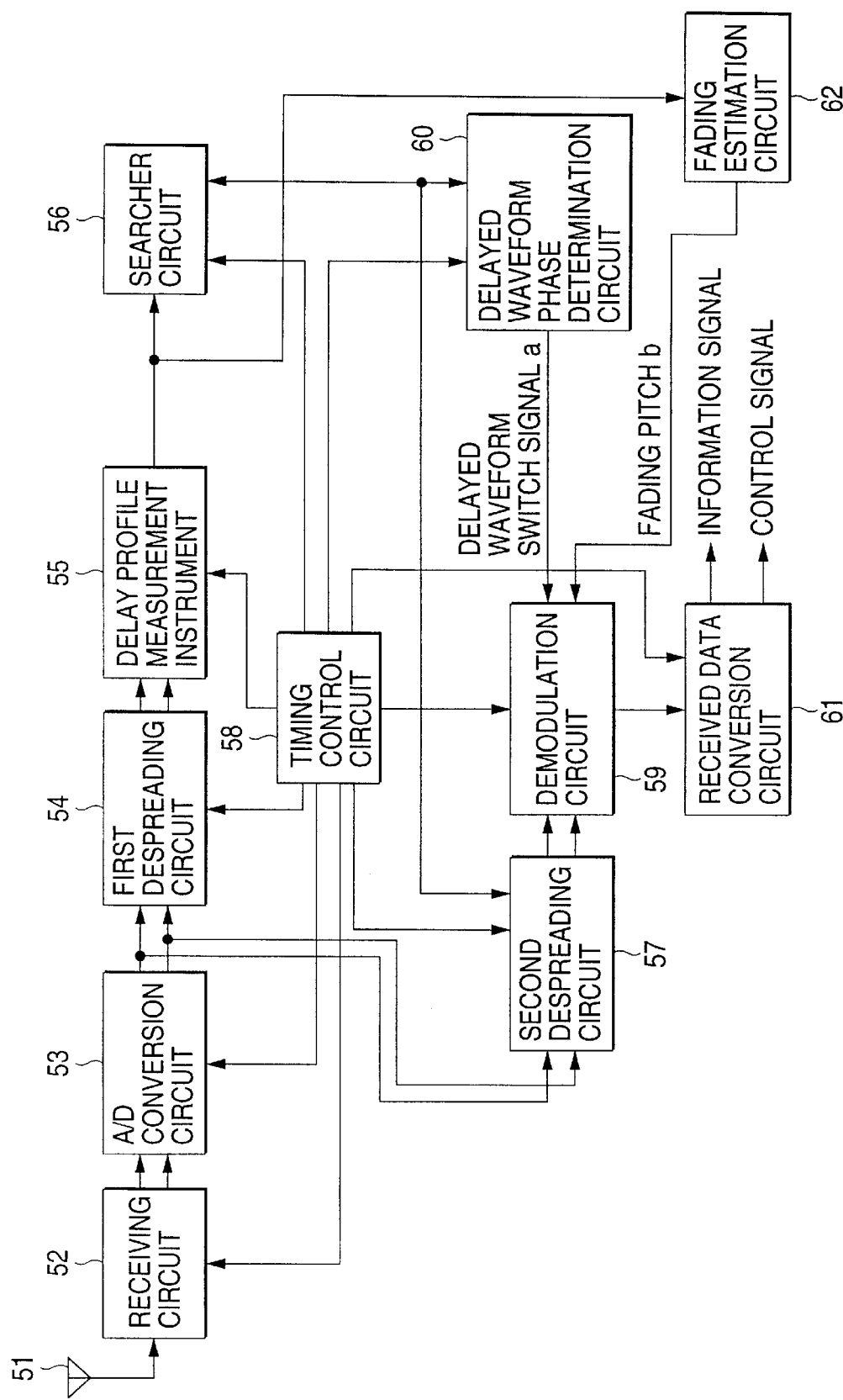
FIG. 5 is a block diagram illustrating the configuration of a spectrum spread receiver according to a third embodiment of the present invention.

FIG. 5 illustrates the configuration of a spectrum spread receiver according to a third embodiment of the present invention. In FIG. 5, reference numeral 51 designates an antenna; 52, a receiving circuit; 53, an A/D conversion circuit; 54, a first despreading circuit; 55, a delay profile measurement instrument; 56, a searcher circuit; 57, a second despreading circuit; 58, a timing control circuit; 59, a demodulation circuit; 60, a delayed waveform phase determination circuit; 61, a received data conversion circuit; and 62, a fading estimation circuit.

With reference to FIG. 5, a signal received by the antenna 51 is amplified by the receiving circuit 52, and the thus-amplified signal is subjected to analog-to-digital conversion by the A/D conversion circuit 53. The first despreading circuit 54 detects correlation, and the delay profile measurement instrument 55 averages the received signal. The searcher circuit 56 selects several higher-level sampled delayed waveforms having a high receiving level and outputs the thus-selected delayed waveforms to the second despreading circuit 57 and the delayed waveform phase determination circuit 60. The second despreading circuit 57 despreads the digital data signal converted by the A/D conversion circuit 53 to thereby obtain received data. The delayed waveform phase determination circuit 60 determines whether or not the delayed waveform detected by the searcher circuit 56 is in the same phase as the previously detected delayed waveform. If they are out of phase with each other, an ON/OFF signal is output to turn on the delayed waveform switch signal a. The fading estimation circuit 62 detects variations in the level of a signal output from the delay profile measurement instrument 55, whereby a fading pitch b is calculated from the amount of variations. In the case where the fading pitch b detected by the fading estimation circuit 62 is slower than the cycle of interpolation of the first and second known signals when the delayed waveform switch signal a is in the ON state, on the basis of the fading pitch b detected by the fading estimation circuit 62, the signal despread by the second despreading circuit 57 and the delayed waveform switch signal a output from the delayed waveform phase determination circuit 60, the demodulation circuit 59 respectively demodulates the first half and second half of the received signal, as a boundary is a received signal at which a delayed waveform switch signal a is turned on, by use of the phase estimated from the first known signal and the phase estimated from the second known signal, without interpolating the phases estimated from the first and second known signals included in both ends of the information signal. The thus-demodulated delayed waveforms are subjected to RAKE synthesis. In contrast, in the case where the fading pitch b detected by the fading estimation circuit 62 is faster than the cycle of interpolation of the first and second known signals, the demodulation circuit 59 respectively demodulates the first half and second half of the received signal, as a boundary is a received signal a at which a delayed waveform switch signal is turned on, by use of the phase that is estimated from the first known signal and then is sequentially updated by an adaptive algorithm or the like, as well as the phase that is estimated from the second known signal and then, is sequentially updated by an adaptive algorithm or the like. The thus-demodulated delayed waveforms are subjected to RAKE synthesis.

In the case where the delayed waveform switch signal a is in the OFF state, it is determined whether the phase is interpolated according to the fading pitch b detected by the fading estimation circuit 62 or the phase is sequentially updated. In the case of interpolation of the phase, required operations are the same as those required in the first embodiment. In the case of sequential updating of the phase, required operations are the same as those required in the second embodiment. The received data conversion circuit 61 obtains desired information by dividing the received data into a control signal and an audio signal or data. The timing control circuit 58 controls all timing and sequences of the spectrum spread receiver.

Figure 6:
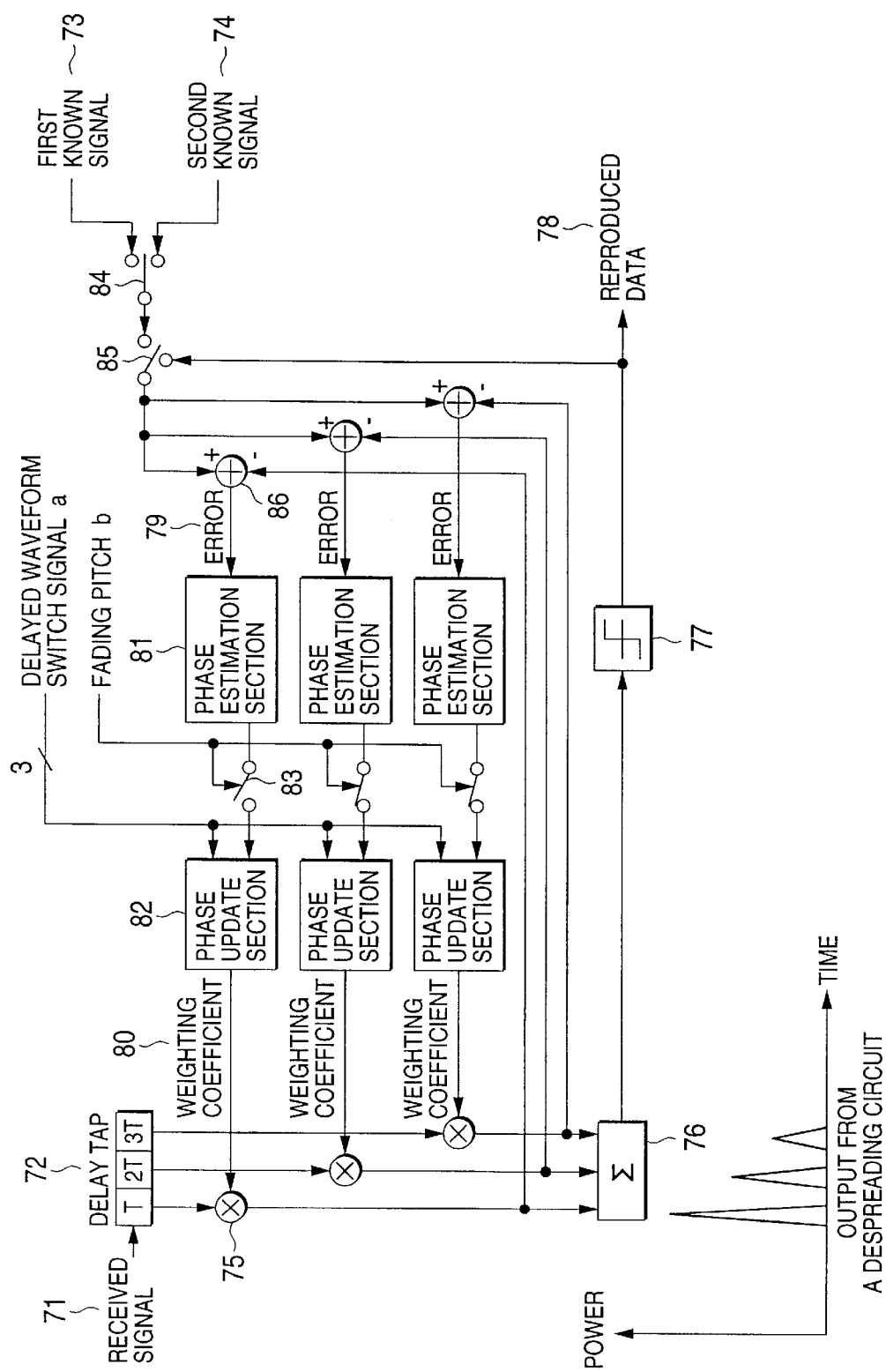
FIG. 6 is a block diagram illustrating the configuration of a demodulation circuit (having a delay tap 3) used in the third embodiment of the present invention.

FIG. 6 illustrates the configuration of the demodulation circuit 59 of the third embodiment. The elements numbered from 71 to 78 provided in FIG. 6 are identical with those numbered from 112 to 119 of the conventional detection circuit provided in FIG. 9. During the periods of the known signals, they operate in the same way as do the elements of the conventional circuit provided in FIG. 9. During the period of the information signal, it is determined according to the fading pitch b whether the switches 83 are turned on or off. If the fading pitch b is slower than the cycle of interpolation of the first and second known signals 73 and 74, the switches 83 is turned off. In contrast, if the fading pitch b is faster than the cycle of interpolation of the first and second known signals 73 and 74, the switches 83 is turned on.

In the case where the delayed waveform switch signal a and the switches 83 are in the ON state, the first half of the received signal before the delayed waveform which the delayed waveform switch signal a becomes in the ON state updates the weighting coefficient 80 of the multiplier 75 so that the weighting coefficient 80 estimated in the period of the first known signal 73 minimizes the square of the sum of error signals 79 (differences between the outputs of the multipliers 75 and the result of the addition of the output of the identifier 77 carried out by the adder 86) for each delayed waveform by using an adaptive algorithm (an RLS algorithm or the like) in the phase update section 82 even in the period of the information signal. These switching operations are performed by the switches 84 and 85. The amplifiers 75 assign the thus-updated optimum weighting coefficients 80 to the delayed waveforms. An adder 76 adds up the thus-weighted delayed waveforms. The identifier 77 then determines whether an output of the adder 76 is positive or negative, thereby reproducing data 78 with fewer errors.

The second half of the received signal updates the weighting coefficient 80 of the multiplier 75 so that the weighting coefficient 80 estimated in the period of the second known signal 73 minimizes the square of the sum of error signals 79 (differences between the outputs of the multipliers 75 and the output of the identifier 77) for each delayed waveform by using an adaptive algorithm (an RLS algorithm or the like) in the phase update section 82 even in the period of the information signal. These switching operations are performed by the switches 84 and 85. The amplifiers 75 assign the thus-updated optimum weighting coefficients 80 to the delayed waveforms. The adder 76 adds up the thus-weighted delayed waveforms. The identifier 77 then determines whether the output of the adder 76 is positive or negative, thereby reproducing the data 78 with fewer errors.

If the delayed waveform switch signal a is in the ON state and the switches 83 are in the OFF state, required operations are the same as those carried out in the case of the first embodiment where the delayed waveform switch signal a is in the ON state.

If the delayed waveform switch signal a is in the OFF state and that the switches 83 are in the ON state, required operations are the same as those carried out in the case of the second embodiment where the delayed waveform switch signal a is in the OFF state.

If the delayed waveform switch signal a and the switches 83 are in the OFF state, required operations are the same as those carried out in the case of the second embodiment where the delayed waveform switch signal a is in the OFF state.

As described above, according to the third embodiment of the present invention, the spectrum spread receiver is provided with the delayed waveform determination circuit 60 and the fading estimation circuit 62. The fading estimation circuit 62 estimates the fading pitch b. Provided that the fading pitch is slower than the cycle of interpolation of the known signals, it is possible to reduce the amount of electric current consumed by the receiver by selecting interpolation synchronization detection as a phase estimation method. In contrast, provided that the fading pitch b is faster than the cycle of interpolation of the known signals, the followability of the receiver with respect to high-speed fading can be improved, thereby improving the quality of the received signal. Even if the phase of a delayed waveform to be demodulated is switched to another phase, the received signal is prevented from becoming degraded.

Fourth Embodiment

Figure 7:
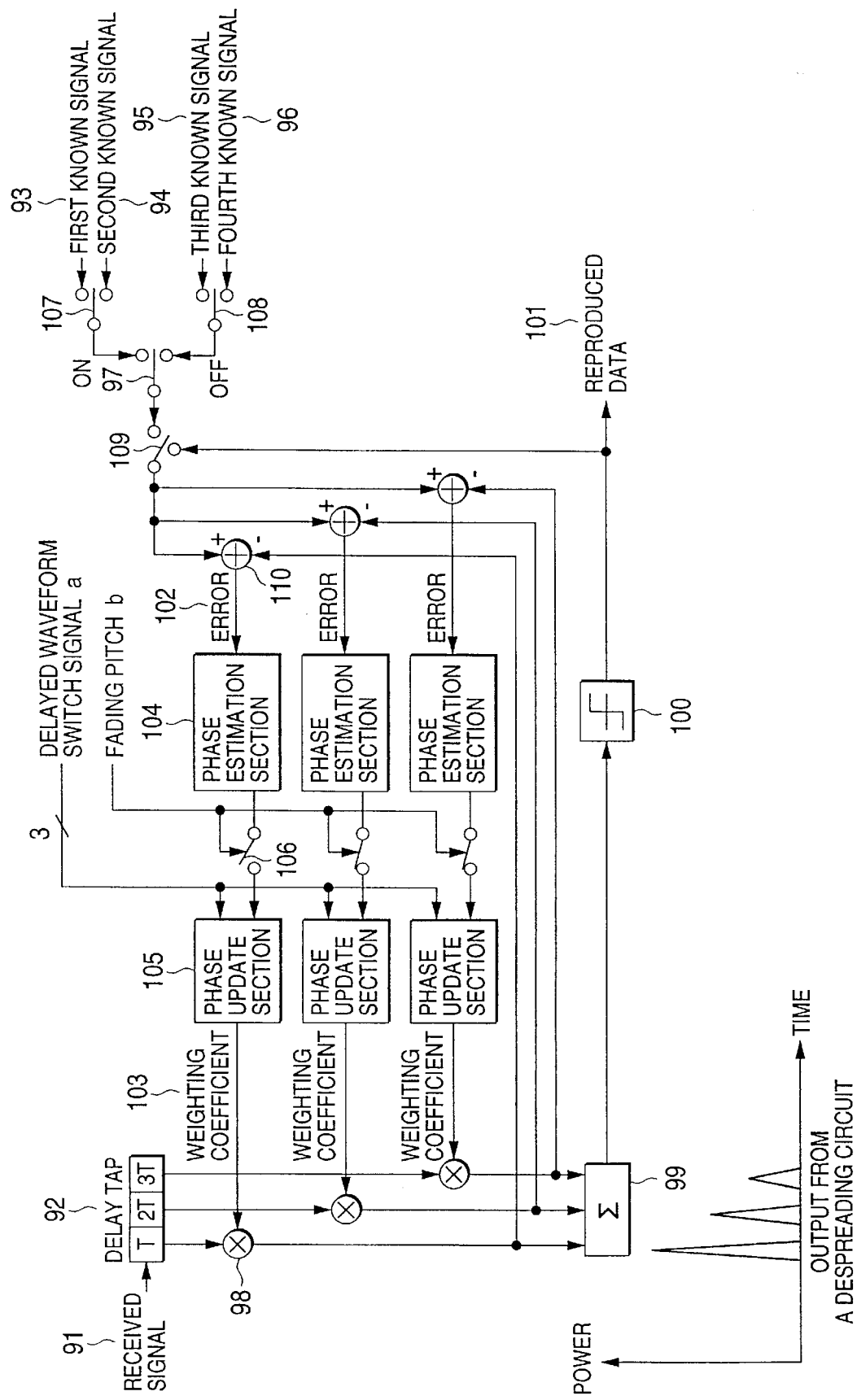
FIG. 7 is a block diagram illustrating the configuration of a demodulation circuit (having a delay tap 3) used in a fourth embodiment of the present invention.
Figure 8:
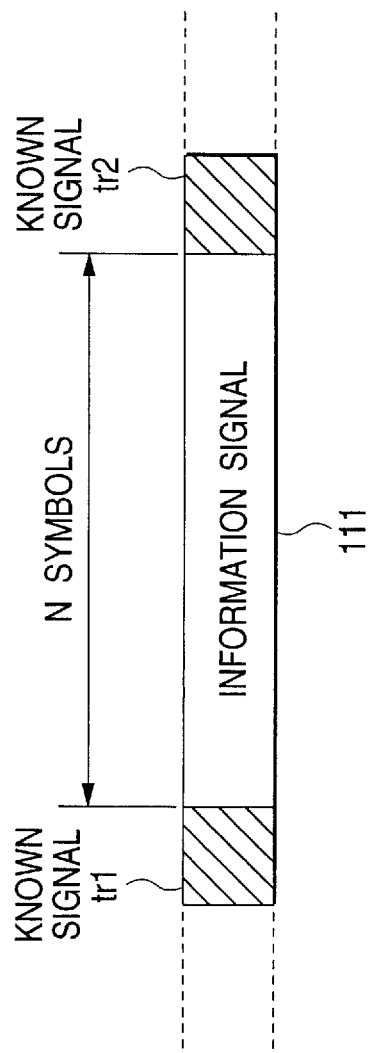
FIG. 8 is a frame structure employed in a spectrum spread method.

A fourth embodiment of the present invention will now be described. A spectrum spread receiver of the fourth embodiment is the same in configuration as that which is provided in FIG. 5 except the configuration and operation of the demodulation circuit 59. FIG. 7 illustrates the configuration of the demodulation circuit of the fourth embodiment. First, when a received signal 91 enters a delay tap 92 having chip intervals, a switch 97 is turned on. Then, during the period between first and second known signals 93 and 94, phase estimation sections 104 estimate transmission paths which are in a varying state due to multipath Reyleigh fading for respective delayed waveforms according to an adaptive algorithm (e.g., an RLS algorithm or the like). The demodulation circuit controls weighting coefficients 103 of amplifiers 98 so as to minimize the square of the sum of errors 102 (the differences between outputs of the amplifiers 98 and the first known signal 93 or second known signal 94 obtained through adding operations carried out by adders 110). Next, on the basis of the phases estimated by the first and second known signals 93 and 94, several samples after the first known signal 93 or several samples before the second known signal 94 of the received signal are demodulated. A third or four known signal 95 is then defined by the first or second known signals 93 and 94 as well as from the thus-demodulated signal. Then, the switch 97 is turned off.

By means of a switch 108, during the period of the third known signal 95 containing the first known signal 93 and demodulated signal of several samples and the fourth known signal 96 containing the second known signal 94 and demodulated signal of several samples, the phase estimation sections 104 again estimate transmission paths which is in a varying state due to multipath Reyleigh fading for respective delayed waveforms according to an adaptive algorithm (e.g., an RLS algorithm or the like). By switching a switch 109, the demodulation circuit controls the weighting coefficients 103 of the multipliers 98 so as to minimize the errors 102 (the differences between the outputs of the multipliers 98 and the third known signal 95 or fourth known signal 96 obtained through adding operations carried out by the adders 110).

During the period of the information signal, it is determined according to a fading pitch b whether switches 106 are turned on or off. If the fading pitch b is slower than the cycle of interpolation of the known signals 93 and 94, the switches 106 are turned off. In contrast, if the fading pitch b is faster than the cycle of interpolation of the first and second known signals 93 and 94, the switches 106 are turned on.

In the case of the delayed waveform in which the delayed waveform switch signal a and the switch 106 is in the ON state, the first half of the received signal before the delayed waveform which the delayed waveform switch signal a becomes in the ON state updates the weighting coefficient 103 of the multiplier 98 so that the weighting coefficient 103 estimated in the period of the third known signal 95 minimizes the square of the sum of error signals 102 (differences between the outputs of the multipliers 98 and the output of the identifier 100) for each delayed waveform by using an adaptive algorithm (an RLS algorithm or the like) in the phase update section 105 even in the period of the information signal. The multipliers 98 assign the thus-updated optimum weighting coefficients to the delayed waveforms. An adder 99 adds up the thus-weighted delayed waveforms. The identifier 100 then determines whether an output of the adder 99 is positive or negative, thereby reproducing data 101 with fewer errors. The second half of the received signal before the delayed waveform which the delayed waveform switch signal a becomes in the ON state updates the weighting coefficient 103 of the multiplier 98 so that the weighting coefficient 103 estimated in the period of the fourth known signal 96 minimizes the square of the sum of error signals 102 (differences between the outputs of the multipliers 98 and the output of the identifier 100) for each delayed waveform by using an adaptive algorithm (an RLS algorithm or the like) in the phase update section 105 even in the period of the information signal. The multipliers 98 assign the thus-updated optimum weighting coefficients 103 to the delayed waveforms. The adder 99 adds up the thus-weighted delayed waveforms. The identifier 100 then determines whether the output of the adder 99 is positive or negative, thereby reproducing the data 101 with fewer errors.

If the delayed waveform switch signal a is in the ON state, and the switches 106 are in the OFF state, the first half received signal of the received signal of the delayed waveform in which the delayed waveform switch signal a is in ON state updates the weighting coefficient 103 of the multiplier 98 so that the weighting coefficient 103 estimated during the period of the third known signal 95 minimizes the square of the sum of the error 102 (differences between the outputs of the multiplier 98 and the output of the identifier 100) for each delay waveform by using an adaptive algorithm (RLS algorithm or the like) in the phase update section 105. The multipliers 98 assign the thus-updated optimum weighting coefficients to the delayed waveforms. The adder 99 adds up the thus-weighted delayed waveforms. The identifier 100 then determines whether the output of the adder 99 is positive or negative, thereby reproducing data 101 with fewer errors. The second half received signal of the received signal of the delayed waveform in which the delayed waveform switch signal a is in ON state updates the weighting coefficient 103 of the multiplier 98 so that the weighting coefficient 103 estimated during the period of the fourth known signal 96 minimizes the square of the sum of the error 102 (differences between the outputs of the multiplier 98 and the output of the identifier 100) for each delay waveform by using an adaptive algorithm (RLS algorithm or the like) in the phase update section 105. The amplifiers 98 assign the thus-updated optimum weighting coefficients 103 to the delayed waveforms. The adder 99 adds up the thus-weighted delayed waveforms. The identifier 100 then determines whether the output of the adder 99 is positive or negative, thereby reproducing the data 101 with fewer errors.

If the delayed waveform switch signal a is in the OFF state, the period of the signal between the known signals is equally divided. The first half received signal updates the weighting coefficient 103 of the multiplier 98 so that the weighting coefficient 103 estimated during the period of the third known signal 95 minimizes the square of the sum of the error 102 (differences between the outputs of the multiplier 98 and the output of the identifier 100) for each delay waveform by using an adaptive algorithm (RLS algorithm or the like) in the phase update section 105 even in the period of the information signal. The multipliers 98 assign the thus-updated optimum weighting coefficients to the delayed waveforms. The adder 99 adds up the thus-weighted delayed waveforms. The identifier 100 then determines whether the output of the adder 99 is positive or negative, thereby reproducing data 101 with fewer errors. The second half received signal updates the weighting coefficient 103 of the multiplier 98 so that the weighting coefficient 103 estimated during the period of the fourth known signal 96 minimizes the square of the sum of the error 102 (differences between the outputs of the multiplier 98 and the output of the identifier 100) for each delay waveform by using an adaptive algorithm (RLS algorithm or the like) in the phase update section 105 even in the period of the information signal. The multipliers 98 assign the thus-updated optimum weighting coefficients 103 to the delayed waveforms. The adder 99 adds up the thus-weighted delayed waveforms. The identifier 100 then determines whether the output of the adder 99 is positive or negative, thereby reproducing the data 101 with fewer errors.

Where the delayed waveform switch signal a and the switches 106 are in the OFF state, the weighting coefficients 103 estimated by the third and fourth known signals 95 and 96 are subjected to the primary interpolation performed by the phase update sections 105 by use of Formula (1), thereby updating the weighting coefficients 103. The multipliers 98 assign the thus-updated optimum weighting coefficients 103 to the delayed waveforms. The adder 99 adds up the thus-weighted delayed waveforms. The identifier 100 then determines whether the output of the adder 99 is positive or negative, thereby reproducing the data 101 with fewer errors.

As described above, according to the fourth embodiment of the present invention, the spectrum spread receiver is provided with the delayed waveform determination circuit 60 and the fading estimation circuit 62. The fading estimation circuit 62 estimates the fading pitch b. If the fading pitch is slower than the cycle of interpolation of the known signals, it is possible to reduce the amount of electric current consumed by the receiver by selecting interpolation synchronization detection as a phase estimation method. In contrast, if the fading pitch b is faster than the cycle of interpolation of the known signals, the followability of the receiver with respect to high-speed fading can be improved, thereby improving the quality of a received signal. Further, the phase of the delayed waveform is estimated again by use of the known signals and the demodulated signal, which enables accurate estimation of the phase. As a result, quality of receipt of a signal can be improved. Even if the phase of a delayed waveform to be demodulated is switched to another phase, it is possible to prevent receipt of the signal from becoming degraded.

As described above, according to the present invention, a spectrum spread communication receiving apparatus is provided with a delayed waveform phase determination circuit which determines whether or not a delayed waveform is in the same phase as the previously detected delayed waveform, and which outputs a delayed waveform changeover ON/OFF signal if they are out of phase with each other. Further, the communications apparatus is provided with a demodulation circuit. Provided that the delayed waveform switch signal is in an ON state, on the basis of the signal despread by a despreading circuit as well as of the delayed waveform switch signal of the delayed waveform phase determination circuit, the demodulation circuit respectively demodulates the first half and second half of the received signal in relation to the point in time at which the delayed waveform switch signal is turned on, by use of the phase estimated from a first known signal and the phase estimated from a second known signal, without interpolating phases estimated from the first and second known signals included in both ends of the received signal for pilot coherent detection scheme with interpolation purposes. As a result, if the phase of the delayed waveform is switched to another phase, the received signal will be prevented from becoming degraded.

What is claimed is:

1. A spectrum spread receiving apparatus for coherent detection scheme with interpolation using pilot symbol spectrum spread mobile communication system, comprising:

first and second despreading circuit for despreading a received signal which is a predetermined number of bits of a digital signal oversampled by an A/D converter circuit;

a delay profile measurement instrument for averaging the profile of each chip phase of the signal despread by said first despreading circuit;

a searcher circuit for detecting a delayed waveform of a predetermined number of higher-level samples having high receiving levels from the signal output from said delay profile measurement instrument, constantly continuing to detect the predetermined number of higher-level samples, and reproducing a symbol clock signal from a position of the peak of the delayed waveform;

a delayed waveform phase determination circuit for determining whether or not the delayed waveform detected by said searcher circuit is in the same phase as the previously detected delayed waveform, and outputting a delayed waveform switch signal if the delayed waveforms are out of phase with each other; and a demodulation circuit which, if the delayed waveform switch signal is in an ON state on the basis of the signal despread by said second despreading circuit and the delayed waveform switch signal, respectively demodulate a first half and a second half of the received signal, as a boundary is a received signal at which the delayed waveform switch signal is turned on, by using a phase estimated from a first known signal and a phase estimated from a second known signal, without interpolating the phases estimated from the first and second known signals included in both ends of an information signal.

2. The spectrum spread receiving apparatus as defined in claim 1, wherein said demodulation circuit sequentially updates the phase estimated by the first known signal and demodulates the first half signal by using thus updated phase, and updates the phase estimated by the second known signal and demodulates the second half signal by using thus updated phase.

3. The spectrum spread receiving apparatus as defined in claim 1, further comprising a fading estimation circuit for detecting variations in the level of the signal output from the delay profile measurement instrument and detecting a fading pitch from the amount of change in the output signal level, when the delayed waveform switch signal is in the ON state;

wherein if the fading pitch detected by said fading estimation circuit is slower than a cycle of interpolation of the known signals and the delayed waveform switch signal is in the ON state, the demodulation circuit respectively demodulates the first half and second half of the received signal by using the phase estimated from the first known signal and the phase estimated from the second known signal, without interpolating the phases estimated from the first and second known signals included in both ends of the information signal;

wherein if the fading pitch detected by said fading estimation circuit is faster than the interpolation period of the known signal and the delayed waveform switch signal is in the ON state, said demodulation circuit sequentially updates the phase estimated by the first known signal and demodulates the first half signal by using thus updated phase, and updates the phase estimated by the second known signal and demodulates the second half signal by using thus updated phase.

4. The spectrum spread receiver as defined in claim 1, further comprising a fading estimation circuit for detecting variations in the level of the signal output from the delay profile measurement instrument and detecting a fading pitch from the amount of change in the output signal level, when the delayed waveform switch signal is in the ON state;

wherein on the basis of the phase estimated from the first and second known signals, the demodulation circuit demodulates a predetermined number of samples after the first known signal and a predetermined number of samples before the second known signal of the received signal, and then, estimates the phase of new first and second known signals containing the first and second known signals and the demodulated signals;

wherein if the fading pitch detected by said fading estimation circuit is slower than a cycle of interpolation of the first and second known signals, said demodulation circuit demodulates the first half of the received signal by using the phase which is estimated from the new first known signal, and demodulates the second half of the received signal by using the phase which is estimated from the new second known signal; and if the fading pitch detected by said fading estimation circuit is faster than the interpolation cycle of the first and second known signals, second demodulation circuit sequentially updates the phase estimated from the new first known signal and demodulates the first half signal by using thus updated phase, and sequentially updates the phase estimated from the new second known signal and demodulates the second half signal by using thus updated phase.

* * * * *